United States Patent
Braune et al.

(10) Patent No.: US 7,454,935 B2
(45) Date of Patent: Nov. 25, 2008

(54) SAFETY METHOD AND OPTOELECTRONIC SENSOR

(75) Inventors: Ingolf Braune, Gundelfingen (DE); Roland Bergbach, Emmendingen (DE)

(73) Assignee: Sick AG, Waldkirch, DE (US)

( * ) Notice: Subject to any disclaimer, the term of this patent is extended or adjusted under 35 U.S.C. 154(b) by 697 days.

(21) Appl. No.: 10/547,268

(22) PCT Filed: Feb. 2, 2004

(86) PCT No.: PCT/EP2004/000926

§ 371 (c)(1),
(2), (4) Date: Aug. 29, 2005

(87) PCT Pub. No.: WO2004/079255

PCT Pub. Date: Sep. 16, 2004

(65) Prior Publication Data

US 2006/0126233 A1    Jun. 15, 2006

(30) Foreign Application Priority Data

Mar. 4, 2003    (DE) .................................. 103 09 399

(51) Int. Cl.
*G06M 7/00* (2006.01)
*B21D 55/00* (2006.01)
*H01J 40/14* (2006.01)

(52) U.S. Cl. .................. 72/21.3; 72/14.3; 72/389.3; 250/221; 250/222.1; 250/559.12; 192/130; 192/134; 100/348

(58) Field of Classification Search .............. 72/14.3, 72/21.1, 21.3, 28.1, 389.3, 389.6; 250/221, 250/222.1, 559.12, 559, 13; 192/130, 134; 100/348
See application file for complete search history.

(56) References Cited

U.S. PATENT DOCUMENTS

| | | | | |
|---|---|---|---|---|
| 4,166,369 | A | * | 9/1979 | Nakajima .................... 72/21.1 |
| 4,249,074 | A | * | 2/1981 | Zettler et al. ................. 250/221 |
| 4,772,801 | A | * | 9/1988 | Fornerod et al. ........... 72/389.3 |
| 4,907,432 | A | * | 3/1990 | Maillefer ..................... 72/21.3 |
| 5,579,884 | A | | 12/1996 | Appleyard et al. |

(Continued)

FOREIGN PATENT DOCUMENTS

DE        27 50 234 B1    1/1979

(Continued)

*Primary Examiner*—David B Jones
(74) *Attorney, Agent, or Firm*—Harness, Dickey & Pierce, P.L.C.

(57) ABSTRACT

A method and an optoelectronic sensor are provided for ensuring the safety of a machine tool having a first tool part carrying out working movements in the direction of a second tool part. The sensor monitors a three-dimensional protected field between the tool parts of the machine tool. At the start of a working movement of a first tool part of the machine tool, the extent of the protected field in the direction of the working movement is smaller than the extent of the open gap between the tool parts. On a continued working movement, the extent of the protected field is continuously reduced and the protected field is held in the center of the open gap. Thereafter, on a further continued working movement, the extent of the protected field is maintained and the protected field is held in the center of the open gap. The sensor is finally deactivated.

17 Claims, 7 Drawing Sheets

U.S. PATENT DOCUMENTS

| | | | |
|---|---|---|---|
| 6,389,860 B1 * | 5/2002 | Stalzer | 72/389.6 |
| 6,677,574 B2 * | 1/2004 | Fiessler | 250/221 |
| 6,919,554 B2 * | 7/2005 | Braune et al. | 250/221 |
| 6,919,555 B2 * | 7/2005 | Fiessler | 250/221 |
| 7,080,534 B2 * | 7/2006 | Schneiderheinze | 72/21.3 |
| 2003/0024421 A1 | 2/2003 | Braune et al. | |
| 2003/0062469 A1 | 4/2003 | Braune et al. | |

FOREIGN PATENT DOCUMENTS

| | | |
|---|---|---|
| DE | 19 17 299 A1 | 2/1998 |
| DE | 100 27 156 A1 | 12/2001 |
| DE | 100 39 142 A1 | 2/2002 |
| DE | 101 38 223 A1 | 2/2003 |
| DE | 202 17 426 U1 | 2/2003 |
| WO | 00/67932 A | 11/2000 |
| WO | 00/67932 A1 | 11/2000 |

* cited by examiner

SAFETY METHOD AND OPTOELECTRONIC SENSOR

CROSS-REFERENCE TO RELATED APPLICATIONS

This application is a National Stage of International Application No. PCT/EP2004/000926, filed Feb. 2, 2004, the disclosure of which, is incorporated herein by reference.

FIELD OF THE INVENTION

The present invention relates to ensuring the safety in use of machine tools, and more particularly to a safety method and optoelectronic sensor for ensuring the safety in use of a machine tool.

BACKGROUND OF THE INVENTION

The invention relates to a method for ensuring the safety in use of a machine tool having a first tool part carrying out working movements in the direction of a second tool part so that, in the course of these working movements, an open gap between the first tool part, on the one hand, and the second tool part or a workpiece to be machined, on the other hand, is gradually closed. In this process, an optoelectronic sensor monitors a three-dimensional protected field between the tool parts in that at least one light ray is transmitted along the open gap between the tool parts by means of a transmitter device and is detected by means of a receiver device. When the sensor detects an interruption of the light ray, a switch-off process is triggered to stop the first tool part in order to prevent a possible injury to an operator of the machine tool.

The invention furthermore relates to a correspondingly configured opto-electronic sensor.

Said machine tool is typically a stamping press for the bending, folding, cutting or stamping of workpieces such as sheet metal parts. Said first tool part is formed in this case by a top tool which has a longitudinal bending line or cutting edge. This top tool is moved, during its working movement, vertically downwardly toward a bottom tool which serves as a second tool part and which contacts or lies on the workpiece.

For each machining process, the previously machined workpiece must first be removed and the new workpiece to be machined must be introduced into the open gap between the tool parts. This is done manually by an operator. To avoid an injury to the operator, in particular to his hands, during the closing of the open gap, the optoelectronic sensor monitors a protected field which typically extends beneath the moved top tool in the case of a stamping press. This protected field is three-dimensional, i.e. at least its outline extends along a two-dimensional cross-section such that the sensor can react fast and reliably to intrusions from different directions.

Such an ensuring of the safety in use of machine tools has proven its value to reduce the explained risk of injury. On the other hand, there is naturally the endeavor that the working movements of the first tool part can be carried out as fast as possible so that the machine tool can work at a high work cycle. However, an increased work cycle conflicts to a certain extent with the monitoring of a large protected field since, with a large protected field, adjustments of the workpiece by the operator which are not dangerous per se can already result in an unwanted switch-off process.

If the extent of the protected field monitored by the sensor is in turn reduced with respect to the direction of the working movement of the first tool part due to these considerations, the further problem exists that possible vibrations of the machine tool can result in the transmitted light ray no longer acting on the receiver device as planned or in its being interrupted by a tool part and that unwanted switch-off processes can therefore likewise occur.

WO 00/67932, for example, describes a press safety system having an optoelectronic sensor whose transmitter device transmits a laser beam extending along a horizontal plane. A cylindrical lens is provided at the receiver side. It is adapted to simplify an adjustment of the planar laser beam and to make the sensor insensitive with respect to vertical vibrations. However, this safety system has the disadvantage that the risk of incorrect switch-offs due to vertical vibrations is only eliminated to a limited extent and also that only a comparatively small protected zone is available in the vertical direction.

SUMMARY OF THE INVENTION

It is an object of the invention to provide a safety method and a correspondingly configured sensor which permit fast working movements for a machine tool, with the open gap between the tool parts being made sufficiently safe and vibrations in the direction of the working movement, in particular in the vertical direction, not easily resulting in incorrect switch-offs.

This object is satisfied by a method and by a sensor having the features of the independent claims and in particular in that the extent of the protected field is smaller in the direction of the working movement than the extent of the open gap at the start of a working movement of the first tool; the protected field initially follows the working movement of the first tool part; on a continued working movement, the extent of the protected field is continuously reduced and the protected field is held in the center of the open gap; thereafter, on a further continued working movement, the extent of the protected field is maintained and the protected field is held in the center of the open gap; and the sensor is finally deactivated.

The following routine is thus provided: a protected field is monitored within the open gap between the tool parts at the start of a working movement whose extent parallel to the direction of the working movement is smaller than the corresponding extent (clearance) of the open gap. Sufficient insensitivity with respect to possible vibrations of the sensor parallel to the working movement is thereby ensured. The protected field can namely be arranged at such spacing from both tool parts due to its smaller extent that, in the event of the explained vibrations, neither of the tool parts interrupts the light ray and thus triggers an unwanted switch-off process.

During the now continued working movement of the first tool, the protected field initially follows this working movement and continuously reduces its extent parallel to the direction of the working movement, with the monitored protected field in turn being held in the center of the open gap between the tool parts. It is thus also ensured during this step that neither of the tool parts accidentally interrupts the light ray in the event of strong vibrations parallel to the working movement. It is of advantage for this purpose for the protected field to be held in the center of the open gap such that it always adopts a pre-determined minimum spacing to the first tool part, on the one hand, and to the second tool part or to the workpiece to be machined, on the other hand.

Finally, for example when the open gap between the tool parts has reached a pre-determined minimum extent, the sensor is completely deactivated (so-called "muting"). This means that the sensor no longer monitors any protected field from this point in time and, consequently, a switch-off process is also no longer triggered when the receiver device of the sensor no longer delivers any received signal.

It is important that, after the explained continuous reduction of the extent of the protected field, but still before the deactivation of the sensor, the extent of the protected field parallel to the direction of the working movement is maintained at times and the protected field is held in the center of the open gap between the tool parts while the working movement of the first tool part further continues. The sensor can thereby namely still monitor a part of the open gap with a minimal protected field in a last monitoring step before the deactivation. At the same time, the desired insensitivity with respect to vibrations parallel to the working movement is continued to be ensured since this minimal protected field is still held in the center of the open gap.

This minimal monitoring in a last phase prior to the final deactivation of the sensor has the effect that the working movement of the first tool part can also take place with the initial fast closing movement of the machine tool at this point in time. A switching to a slower closing speed is therefore not absolutely required. A continuously fast closing movement is thus possible and the machine tool can be operated at a high work cycle, without the safety of the operator being limited thereby.

In contrast, the arrangement is, as explained, insensitive with respect to vibrations, in particular with respect to vertical vibrations in the event of a stamping press, up to the final deactivation of the sensor. In summary, the invention thus provides a dynamization of the protected field in dependence on the open gap of the machine tool, with the protected field being adjusted in the center of the remaining open gap—in particular in a symmetrical arrangement—to achieve high insensitivity with respect to vibrations.

In accordance with a further development of the invention, a normal mode or a box mode can optionally be set for the operation of the machine tool, with the protected field extending along a front space and a back space with respect to the plane of movement of the first tool part in the normal mode. In the box mode, in contrast, an interruption of the light ray only triggers a switch-off process if this interruption takes place both inside the front space and inside the back space. The machining of box-shaped peak pieces, which necessarily partly project into the protected field, is thereby also possible with sufficient safety and high efficiency.

In accordance with an alternative or additional further development of the invention, a normal mode or a stop mode can optionally be set for the operation of the machine tool, with the protected field extending along a front space and a back space with respect to the plane of movement of the first tool part in the normal mode. In the stop mode, in contrast, the protected field is deliberately muted within part of the front space and/or of the back space so that a tool stop can enter into the muted part without an interruption of the light ray caused thereby triggering a switch-off process. Stop elements can thereby be used, for example for the bending of short limbs, which project into the protected field during the explained movement of said protected field without unwanted and unnecessary downtimes resulting.

The working movement of the first tool part can therefore take place at a continuously high closing speed up to the actual machining process both in the box mode and in the stop mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
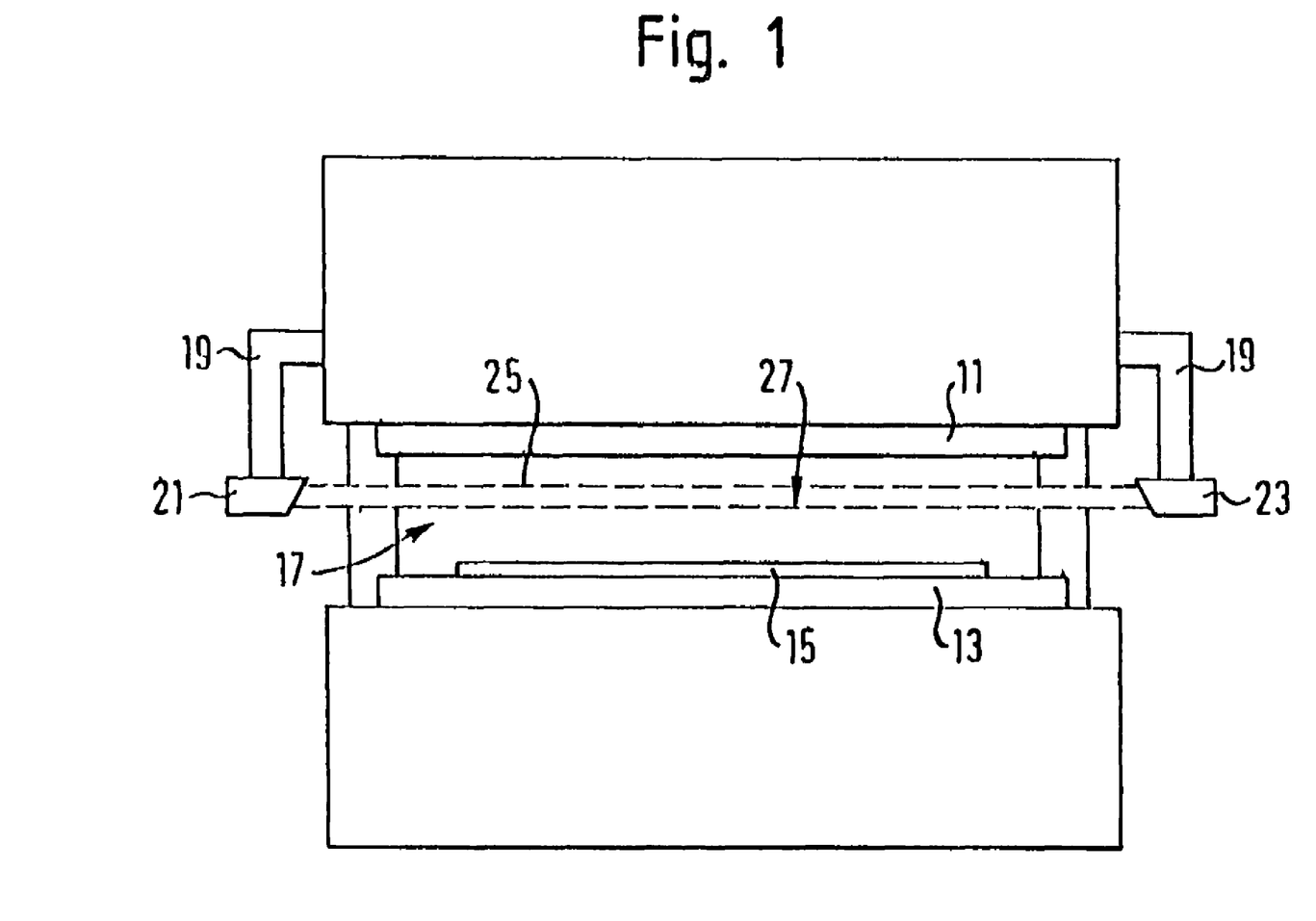
FIG. 1 shows a schematic front view of a stamping press.

The stamping press shown in FIG. 1 has a top tool 11 which can be driven to make a working movement vertically downwardly toward a bottom tool 13 in order to bend a workpiece 15 lying on the bottom tool 13. An open gap 17 between the top tool 11 and the workpiece 15 is gradually closed during this working movement.

A respective holding arm 19 is provided at both sides of the top tool 11. The holding arms 19 carry a transmitter device 21 and a spatially resolving receiver device 23 which are parts of an optoelectronic sensor. The transmitter device 21 has a laser diode with an optical transmitter device (not shown in the Figures) which expands the transmitted light of the laser diode into a light ray 25. The receiver device 23 has a rectangular CMOS matrix receiver on which the light ray 25 acts.

The light ray 25 passes through the open gap 17 beneath the top tool 11. The outline of the activated part of the receiver device 23 thus defines a three-dimensional protected field 27 within the light ray 25 between the top tool 11 and the bottom tool 13, as will be explained in the following. As soon as an evaluation and control device of the sensor (not shown in the Figures) detects an interruption of the light ray 25 inside the protected field 27, it triggers a switch-off process to stop the top tool 11. An operator, for example introducing the workpiece 15 into the open gap 17, is thereby protected from injury by the top tool 11.

The function of the stamping press in a normal mode in accordance with FIG. 1 will be described in the following with reference to FIGS. 2a to 2f. FIGS. 2a to 2f each show the top tool 11, the bottom tool 13, the workpiece 15 lying thereon, the light ray 25, which is circular in cross-section, and the receiver device 23 fully acted on thereby in a schematic side view. A different set of the individual CMOS receiver elements of the receiver device 23 is respectively activated in FIGS. 2a to 2f. Only these activated receiver elements are therefore monitored for an interruption of the light ray 25 to optionally trigger a switch-off process. The arrangement of these activated receiver elements determines the cross-section of the protected field 27 in this process. The actually monitored protected field 27—drawn hatched in the Figures—is thus located inside a monitorable observation field whose cross-section corresponds to the outline of the receiver device 23.

Furthermore, the following spacings and extents are designated in the Figures—in each case with different indices for different value magnitudes:

A designates the clearance of the top tool 11 from the receiver device 23 in the side view;

B designates the vertical extent of the upper deactivated region of the receiver device 23;

C designates the vertical extent of the protected field 27;

D designates the vertical spacing between the protected field 27 and the workpiece 15 to be machined; and E designates the vertical extent of the open gap 17.

Figure 2A:
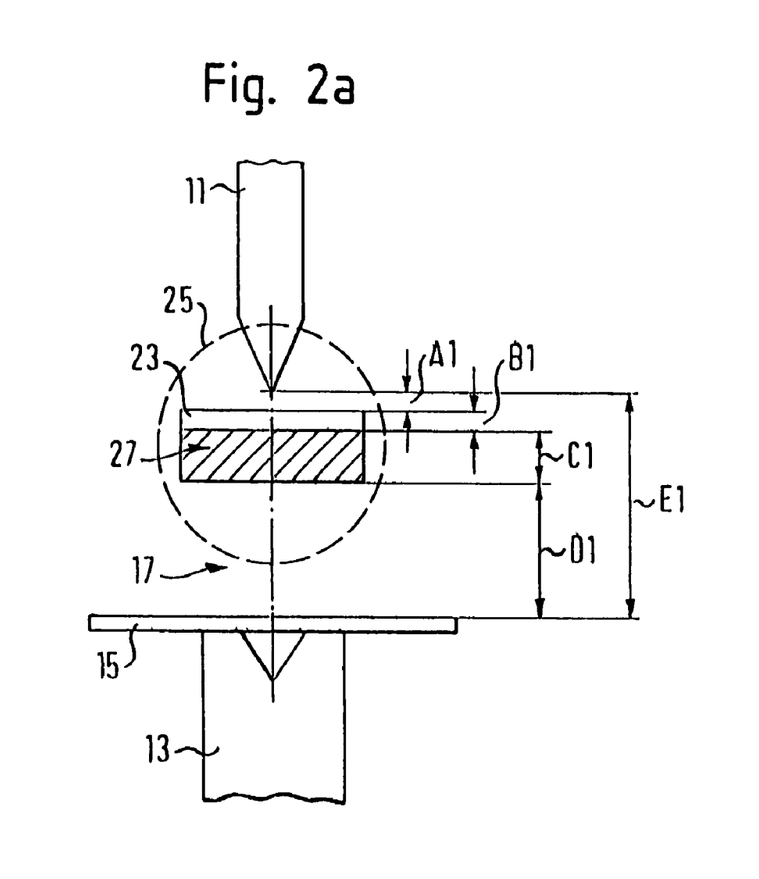
FIGS. 2a-2f each show a schematic side view of parts of this stamping press in different phases of a normal machining process.

FIG. 2a shows the start of a working movement of the top tool 11. The vertical extent C1 of the protected field 27 is much smaller than the vertical extent E1 of the open gap 17. The protected field 27 in particular adopts a vertical spacing A1+B1 to the top tool 11 and a vertical spacing D1 to the workpiece 15. The following values can be provided, for example:

A1=2 mm
B1=5 mm
C1=9 mm

Vertical vibrations of the sensor parts 21, 23 secured to the holding arms 19 can occur due to acceleration processes or to braking processes. The light ray 25 or the receiver device 23 can thereby carry out vertical movements with respect to the side view in accordance with FIG. 2a. It can, however, be seen from the side view in accordance with FIG. 2a that such vibrations cannot result in unwanted incorrect switch-offs. On the one hand, the light ray 25 is namely sufficiently large to always act completely on the light receiver 23. On the other hand, the protected field 27 is, as explained, sufficiently spaced apart with respect to the lower edge of the top tool 11 that the top tool 11 does not project into the protected field 27 even on a vibration of the arrangement.

It must also be remarked in this connection that the receiver device 23 can also be completely activated, since the vertical spacing A1 of the receiver device 23 from the top tool 11 would also be sufficient to prevent an unwanted intrusion of the top tool 11 into the protected field 27 in the event of vertical vibrations.

Figure 2B:
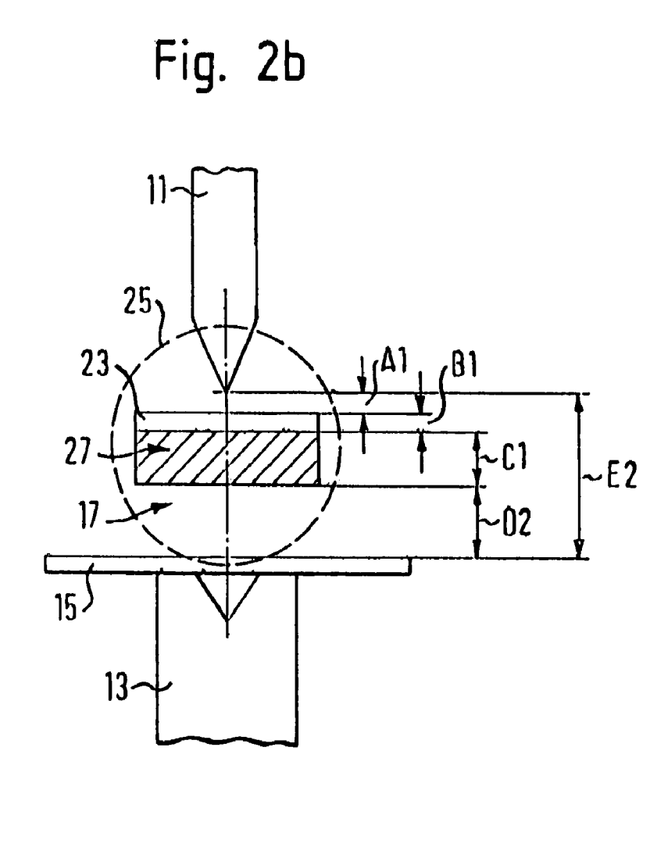

FIG. 2b shows how the protected field 27 initially follows the working movement of the top tool 11. The clearance A1 between the top tool 11 and the receiver device 23 is generally maintained—with the exception of the case of the explained vertical vibrations—since the vertical device 23 is firmly connected to the top tool 11 via the holding arm 19 (FIG. 1).

The vertical extent B1 of the upper deactivated region of the receiver device 23 and the vertical extent C1 of the protected field 27 are initially maintained. This is, however, not absolutely necessary.

The vertical extent E2 of the open gap 17, and accordingly the vertical spacing D2 between the protected field 27 and the workpiece 15, however, gradually decrease.

Figure 2C:
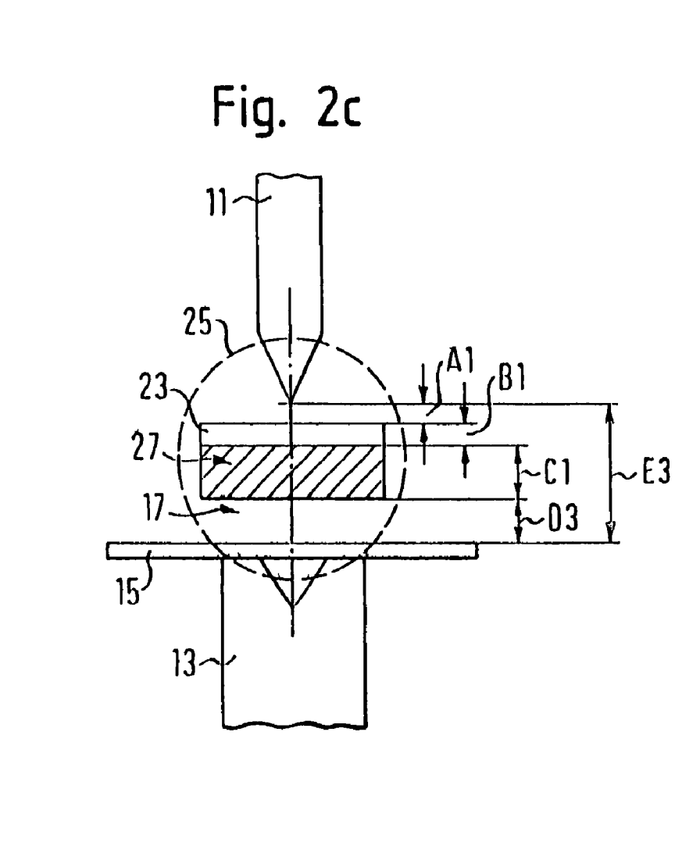

The state shown in FIG. 2c is achieved in this manner. The vertical spacing D3 between the protected field 27 and the workpiece 15 is now reduced to a pre-determined value. Starting from this state, the vertical extent C1 of the protected field 27 is continuously reduced with a continued working movement of the top tool 11 and the protected field 27 is held in the center of the open gap 17.

It can be observed that, in the state in accordance with FIG. 2c, the protected field 27 is arranged precisely symmetrically in the center between the top tool 11 and the workpiece 15. The vertical spacing D3 between the protected field 27 and the workpiece 15 can amount, for example, to 7 mm, whereas the clearance of A1+B1 of the protected field 27 to the top tool 11 continues likewise to amount to 7 mm. This symmetrical arrangement is, however, not absolutely necessary. A central arrangement of the protected field 27, with minimum spacings to the top and to the bottom, is sufficient for the explained avoidance of incorrect switch-offs due to vertical vibrations.

In addition, it must also be remarked that, for example, the condition can also be provided as the trigger criterion for the following continuous reduction of the vertical extent C1 of the protected field 27 that the open gap 17 has reached a pre-determined vertical extent E3.

Figure 2D:
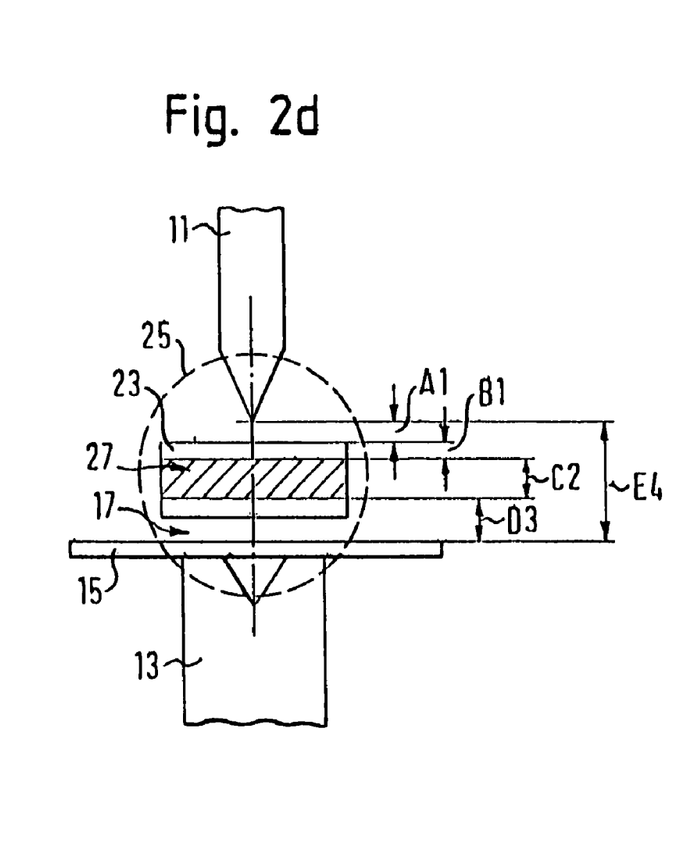

FIG. 2d shows the said subsequent continuous reduction of the vertical extent C2 of the protected field 27 on a continued working movement of the top tool 11. This reduction of the extent of the protected field C2 takes place in that now the vertical spacing D3 between the protected field 27 and the workpiece 15 is maintained. For this purpose, receiver elements from the lower region of the receiver device 23 are successively deactivated, i.e. there is no longer any monitoring of an interruption of the light ray 25 for these receiver elements.

It is simultaneously achieved in this manner that the protected field 27 is continued to be held in the center of the open gap 17. It thereby remains ensured that a respective minimum distance A1+B1 or D3 is observed between the protected field 27, on the one hand, and the top tool 11 and the workpiece 15, on the other hand, such that vertical vibrations of the arrangement do not result in the top tool 11 or the workpiece 15 projecting into the protected field 27 and thereby triggering an incorrect switch-off.

The selection of the activated and deactivated receiver elements of the receiver device 23 can also in particular be made here such that the protected field 27 is arranged symmetrically with respect to the top tool 11 and the workpiece 15. This is, however, not absolutely necessary.

It can moreover be seen from FIG. 2d that the vertical spacing A1+B1 between the top tool 11 and the protected field 27 corresponds precisely to the vertical spacing as at the start of the working movement in accordance with FIG. 2a. This is, however, also not absolutely necessary.

Figure 2E:
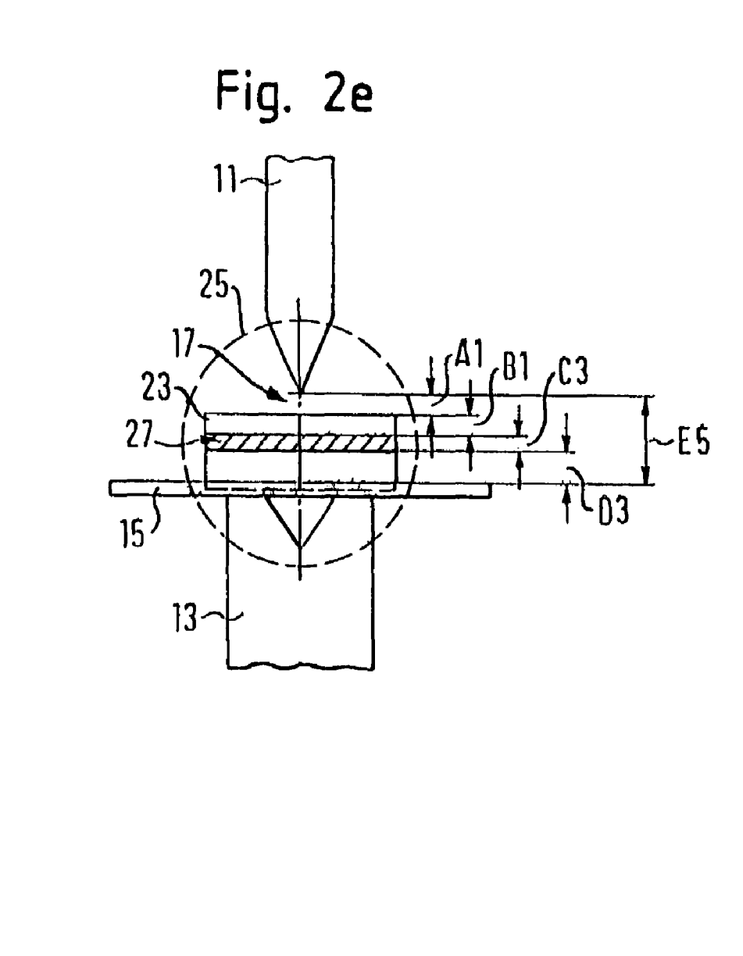

FIG. 2e shows the state thus reached, with the vertical extent of the protected field 27 now having adopted a pre-determined value C3 (for example 2 mm). After achieving this value, the vertical extent C3 of the protected field 27 is maintained during the continued working movement of the top tool 11 and the protected field 27 is continued to be held in the center of the open gap 17.

It must still be remarked with respect to FIG. 2e that it can, for example, also be provided as the trigger criterion for the explained following maintenance of the extent of the protected field that a pre-determined vertical spacing D3 has been reached between the protected field 27 and the workpiece 15 or that a pre-determined vertical extent E5 of the open gap has been reached.

It must furthermore be remarked with respect to FIG. 2e that, in the state shown therein, the vertical spacing D3 between the protected field 27 and the workpiece 15 precisely corresponds to the vertical spacing A1+B1 between the protected field 27 and the top tool 11 (for example 7 mm). The protected field 27 is thus arranged precisely symmetrically between the workpiece 15 and the top tool 11. This is, however, not absolutely necessary. A central arrangement with minimum spacings to the workpiece 15 and the top tool 11 is sufficient to satisfy a sufficient safety function and to ensure the explained insensitivity with respect to vertical vibrations.

Figure 2F:
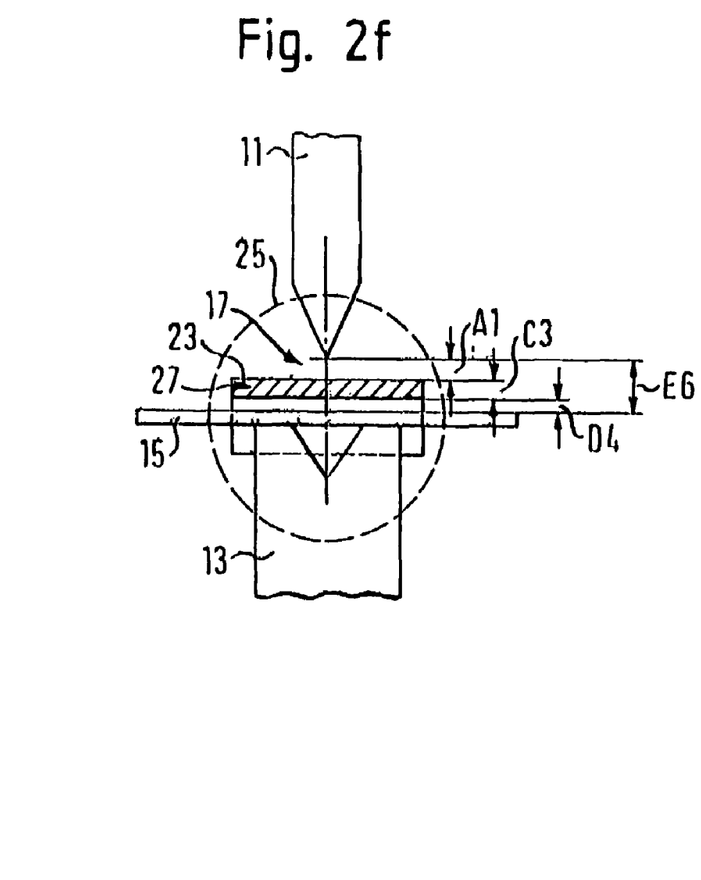

FIG. 2f shows the state after the vertical extent C3 of the protected field 27 has been maintained—as explained—with a further continued working movement of the top tool 11 and the protected field 27 has been held in the center of the open gap 17. A further trigger criterion is moreover achieved in the state in accordance with FIG. 2*f*: the vertical spacing D4 between the protected field 27 and the workpiece 15 now adopts a pre-determined value. The sensor is now completely deactivated due to the reaching of this trigger criterion. The light ray 25 can therefore be interrupted as desired without a switch-off process thereby being triggered.

Alternatively, it can also be provided as the trigger criterion, for example, that a pre-determined vertical extent E6 of the open gap 17 has been reached.

It can furthermore be seen from FIG. 2*f* that the protected field 27 has been moved vertically upwardly along the receiver device 23 during the transition from the state in accordance with FIG. 2*e* to the state in accordance with FIG. 2*f* so that the protected field 27 is hereby held in the center of the open gap 17. In the state shown in FIG. 2*f*, the protected field 27 is preferably arranged precisely symmetrically between the top tool 11 and the workpiece 15, for example at a respective spacing A1 or D4 of 2 mm, with the vertical extent C3 of the protected field 27 likewise being able to amount to 2 mm.

The explained safety method and the corresponding configuration of the sensor have the advantage that the open gap 17 between the top tool 11 and the workpiece 15 to be machined is protected in each of the steps of the working movement shown in FIGS. 2*a* to 2*f* by a central protected field 27 for so long until the protected field 27 can be completely muted, since a risk of injury is now also precluded without monitoring due to the small remaining gap extent E6. A protected field 27 with a minimum vertical extent C is therefore monitored in every phase—also directly prior to the final deactivation of the sensor—so that a switch-off process can still be triggered in the event of an unauthorized intrusion by the operator.

A central arrangement of the protected field 27 inside the open gap 17 is moreover provided in every phase shown having a respective minimum spacing A1 and D4 to the top tool 11 or the workpiece 15. It is thereby ensured that vertical vibrations of the top tool 11, and thus of the receiver device 23, do not result in an unwanted engagement of the top tool 11 into the protected field 27 and thus in an incorrect switch-off of the machine tool.

A further advantage of this ensuring of the safety in use is that the working movement of the top tool 11 can take place up to the start of the actual machining movement at a comparatively high closing speed which corresponds to the closing speed at the start of the working movement (FIG. 2*a*). A switching over of the working movement from a first closing speed to a successive lower second closing speed is therefore not absolutely necessary due to the continuous ensuring of the safety in use up to the final deactivation of the sensor.

It is, however, naturally possible to provide such a division. It is preferred in this case for the point in time of the switching over between the faster and the slower closing movement to be selected in dependence on the braking path of the top tool 11 and not in dependence on the so-called lagging path. Experience has shown that the braking path of a moved first tool part is namely longer than the pure lagging path. It is therefore furthermore preferred for this braking path to be determined empirically prior to the actual working movements of the first tool part or of the top tool 11.

Figure 3A:
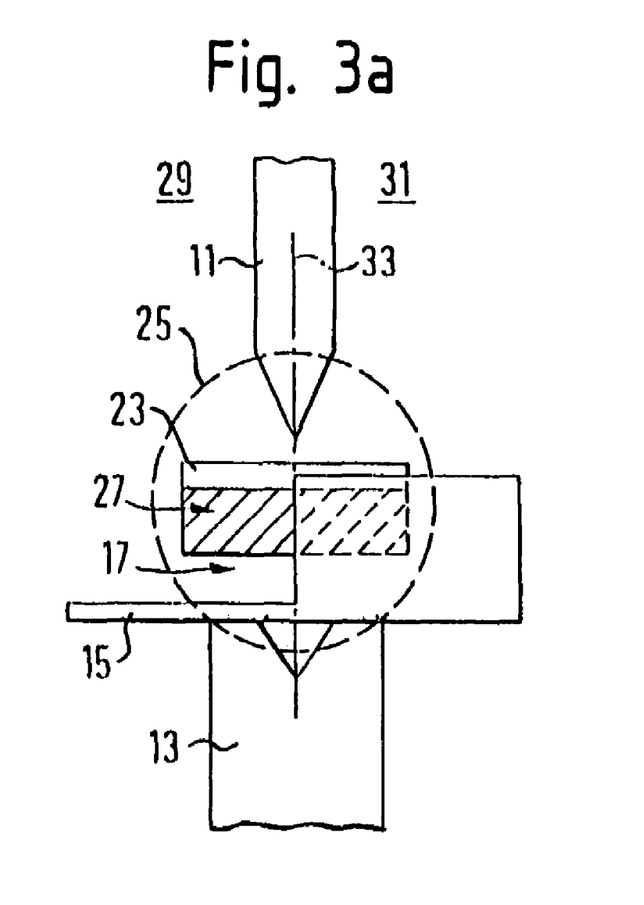
FIGS. 3a-3c each show a schematic side view of parts of this stamping press in different phases of a box machining.
Figure 3B:
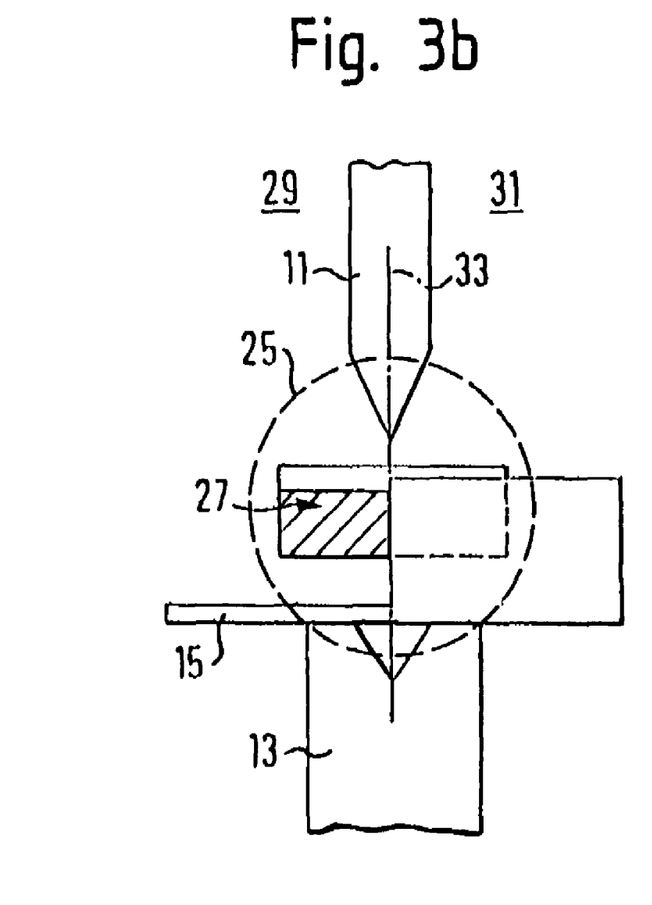
Figure 3C:
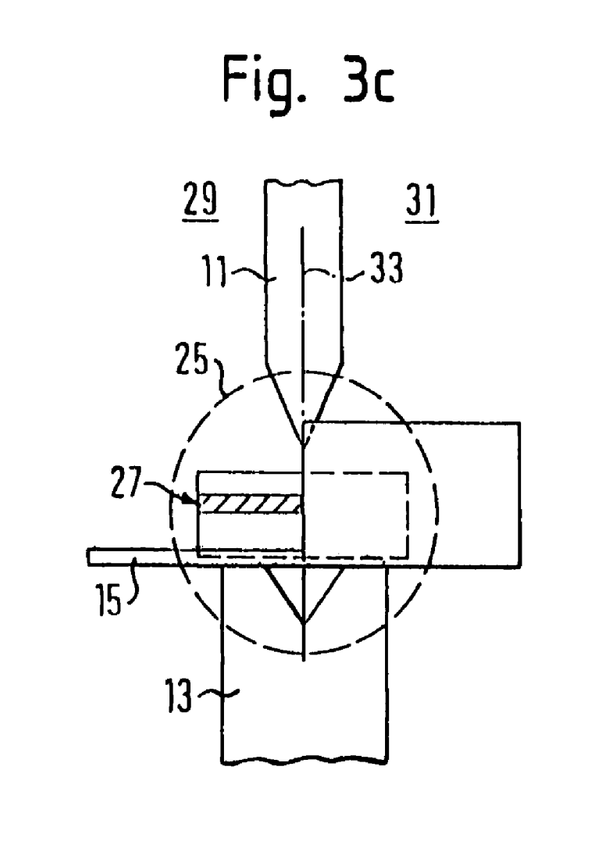

FIGS. 3*a* to 3*c* show a further development of the safety method in accordance with FIGS. 2*a* to 2*f*, with like reference numerals designating the same parts. In this further development, a box mode is provided for the operation of the machine tool in addition to the normal mode as was explained with reference to FIGS. 2*a* to 2*f*. In this box mode, an interruption of the light ray 25 only triggers a switch-off process if this interruption takes place with respect to the plane of movement 33 of the top tool 11 both inside a front space 29 and inside a back space 31. If, in contrast, the interruption takes place only in the front space 29 or only in the back space 31, this is considered an authorized intervention into the protected field 27 by the evaluation and control device of the sensor and the horizontal extent of the protected field 27 is thereupon reduced to the respective other spatial region 31 or 29.

FIG. 3*a* shows the position of the top tool 11, of the light ray 25, of the receiver device 23 and of the protected field 27 in accordance with the position in accordance with FIG. 2*c*. However, a box to be machined is placed on the bottom tool 13 as the workpiece 15 here. The box 15 intrudes into the protected field 27 inside the back space 31. However, this should exceptionally not result in the triggering of a switch-off process. Instead, the evaluation and control device of the sensor recognizes that it is a permitted intervention by a workpiece 15. Accordingly, it reduces the extent of the protected field 27 automatically such that the protected field 27 only extends inside the front space 29.

FIG. 3*b* shows the extent adopted by the protected field 27 after this switch in the side view.

The control of the vertical extent and of the vertical position of the protected field 27 takes place in another respect in the same manner as explained with respect to FIGS. 2*a* to 2*f*. FIG. 3*c*, for example, corresponds to the state in accordance with FIG. 2*e*.

The described box mode therefore has the advantage, in view of the automatic recognition of a permitted intervention into the protected field 27 and of the subsequent corresponding reduction of the protected field 27, that a continuous fast machining of box-shaped workpieces 15 is also possible. The speed of the working movement of the top tool 11 does not therefore have to be reduced. The safety of the operator nevertheless remains ensured to a sufficient degree.

It must still be remarked with respect to FIGS. 3*a* to 3*c* that the evaluation and control device is also able to automatically recognize if the box-shaped workpiece 15 is located in the front space 29 so that the back space 31 can also be muted in this case.

Alternatively or additionally to the explained box mode, a stop mode can also be set in order to permit an allowed intervention of a stop element into the protected field 27.

Figure 4A:
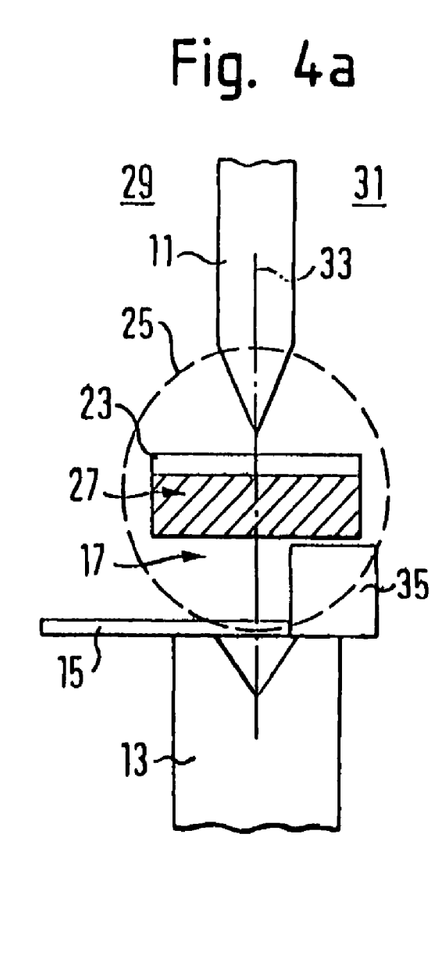
FIGS. 4a-4c each show a schematic side view of parts of this stamping press in different phases of a machining process in a stop mode.
Figure 4B:
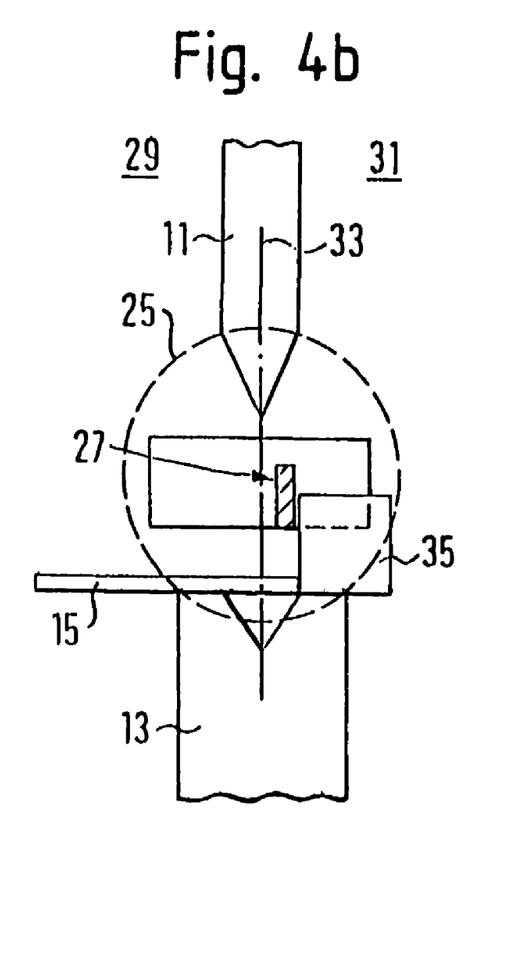
Figure 4C:
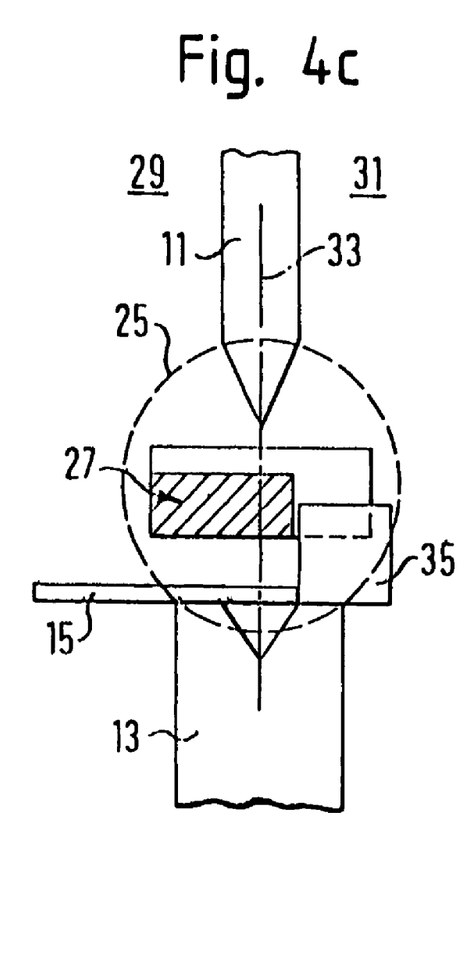

FIGS. 4*a* to 4*c* show different phases of the ensuring of the safety in use of the machine tool in accordance with FIG. 1 in such a stop mode, with like reference numerals as in FIGS. 2*a* to 2*f* and FIGS. 3*a* to 3*c* designating the same parts.

FIG. 4*a* corresponds to the state in accordance with FIG. 2*b*. A stop element 35 can be recognized here which serves as a side support for the workpiece 15. It can be seen that, with a customary course of the safety method, the stop element 35 would soon intervene into the protected field 27 and would thereby trigger a switch-off process.

If, however, the stop mode has been set by the operator before the start of the working movement of the top tool 11, the protected field 27 is muted within part of the front space 29 and/or of the back space 31 such that the stop element 35 can interrupt the light ray 25 without triggering a switch-off process.

FIG. 4*b* shows by way of example an extent of the protected field 27 which is much reduced with respect to the extent in accordance with FIG. 4*a*. Since this protected field 27 extends in accordance with FIG. 4*b* close to and along the plane of movement 33 of the top tool 11, a risk of injury for the operator continues to be precluded to a sufficient degree.

FIG. 4c shows a different kind of reduction of the protected field 27 by way of example. The protected field 27 also extends along the front space 29 here with respect to the extent of the protected field 27 in accordance with FIG. 4b.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMERAL LIST 11 top tool
13 bottom tool
15 workpiece
17 open gap
19 holding arm
21 transmitter device
23 receiver device
25 light ray
27 protected field
29 front space
31 back space
33 plane of movement of the top tool
35 stop element
A clearance between the top tool and the receiver device
B vertical extent of the upper deactivated region of the receiver device
C vertical extent of the protected field
D vertical spacing between the protected field and the workpiece
E vertical extent of the open gap

The invention claimed is:

1. A method for ensuring the use of a machine tool having a first tool part carrying out working movements in a direction of a second tool part so that during these working movements, an open gap between the first tool part and one of the second tool part and a workpiece to be machined, is gradually closed, the method comprising:
monitoring a three-dimensional protected field between the tool parts using an optoelectronic sensor;
transmitting at least one light ray along the open gap by means of a transmitter device and detecting the at least one light ray by means of a receiver device;
triggering a switch-off process to stop the first tool part when the sensor detects an interruption of the at least one light ray;
wherein the switch-off process comprises:
maintaining an extent (C1) of the protected field in a direction of the working movement smaller than an extent (E1) of the open gap, upon commencing working movement of the first tool part, wherein the protected field initially follows the working movement of the first tool part;
continuously reducing the extent (C2) of the protected field and holding the protected field in the center of the open gap, upon continued working movement;
maintaining the extent (C3) of the protected field and holding the protected field in the center of the open gap upon further continued working movement; and
deactivating the sensor.

2. A method in accordance with claim 1, wherein at a start of the working movement, the protected field is arranged inside the open gap such that the protected field adopts a minimum spacing (A1+B1 and D1, respectively) relative to the first tool part as well as relative to one of the second tool part and the workpiece to be machined.

3. A method in accordance with claim 1, wherein the protected field is arranged inside the open gap while it initially follows the working movement of the first tool part, to enable the protected field to always adopt a minimum spacing (A1+B1 and D2, respectively) relative to the first tool part and relative to one of the second tool part and the workpiece to be machined.

4. A method in accordance with claim 1, wherein the step of continuously reducing the extent (C2) of the protected field and holding the protected field in the center of the open gap is carried out after one of reaching a pre-determined spacing (D3) between the protected field and one of the second tool part and the workpiece to be machined, and reaching a pre-determined extent (E3) of the open gap.

5. A method in accordance with claim 1, wherein during the step of continuously reducing the extent (C2) of the protected field, the protected field is held in the center between the tool parts to enable the protected field to adopt a minimum spacing (A1+B1 and D3, respectively) relative to the first tool part and to one of the second tool part and the workpiece to be machined, wherein the spacing (D3) between the protected field and between one of the second tool part and the workpiece to be machined is maintained.

6. A method in accordance with claim 1, wherein the step of maintaining the extent (C3) of the protected field and holding the protected field in the center of the open gap is carried out after one of:
reaching a pre-determined extent (C3) of the protected field;
reaching a pre-determined spacing (D3) between the protected field and one of the second tool part and the workpiece to be machined; and
reaching a pre-determined extent (E5) of the open gap.

7. A method in accordance with claim 1, wherein during the step of maintaining the extent (C3) of the protected field, the protected field is held in a symmetrical arrangement between the first tool part and one of the second tool part and the workpiece to be machined.

8. A method in accordance with claim 1, wherein the step of deactivating the sensor is carried out after one of:
reaching a pre-determined spacing (D4) between the protected field and one of the second tool part and the workpiece to be machined; and
reaching a pre-determined extent (E6) of the open gap.

9. A method in accordance with claim 1, wherein the working movement of the first tool is divided into a first closing movement and into a subsequent slower second closing movement, wherein a point in time of switching between the first and the second closing movements is selected based on the braking path of the first tool part.

10. A method in accordance with claim 9, wherein the braking path of the first tool part is empirically determined prior to the working movements of the first tool part.

11. A method in accordance with claim 1, wherein one of a normal mode and a box mode is optionally selected for the operation of the machine tool, wherein, in the normal mode, the protected field extends along a front space and a back space with respect to the plane of movement of the first tool part; and
wherein, in the box mode, an interruption of the at least one light ray only triggers the switch-off process if the interruption takes place both inside the front space and inside the back space with respect to the plane of movement of the first tool part.

12. A method in accordance with claim 1, wherein one of a normal mode and a stop mode is optionally selected for the operation of the machine tool, wherein, in the normal mode, the protected field extends along a front space and a back space with respect to the plane of movement of the first tool part; and wherein, in the stop mode, the protected field is muted inside a part of one of the front space and of the back space so that a tool stop can intrude into the muted part without an interruption of the at least one light ray which would thereby trigger a switch-off process.

13. A method in accordance with claim 1, further comprising selecting the protected field monitored by the sensor from an observation field monitorable by the sensor.

14. A method in accordance with claim 1, further comprising mounting the sensor firmly to the first tool part, such that it is moved along with the first tool part during the working movement.

15. A method in accordance with claim 1, further comprising constructing the receiver device of the sensor to be spatially resolving, in particular as a matrix-like CMOS receiver.

16. A method in accordance with claim 1, wherein the machine tool is a stamping press and the first tool part is formed by a top tool moved vertically downwardly toward a bottom tool.

17. An optoelectronic sensor for ensuring the safety in use of a machine tool having a first tool part that carries out working movements in the direction of a second tool part so that, in the course of these working movements, an open gap between the first tool part and one of the second tool part and a workpiece to be machined is gradually closed, the sensor comprising:

a transmitter device for the transmission of at least one light ray along the open gap;

a receiver device for the detection of the at least one light ray for the monitoring of a three-dimensional protected field between the tool parts; and an evaluation and control device for triggering switch-off process when the sensor detects an interruption of the at least one light ray;

wherein the sensor is configured such that at a start of the working movement of the first tool part, the extent ($C_1$) of the protected field in the direction of the working movement is smaller than the extent ($E_1$) of the open gap; the protected field initially follows the working movement of the first tool part, upon a continued working movement; the extent ($C_2$) of the protected field is continuously reduced and the protected field is held in the center of the open gap, upon further continued working movement; the extent ($C_3$) of the protected field is maintained and the protected field is held in the center of the open gap; and the sensor is finally deactivated.

* * * * *